(12) United States Patent
Mo

(10) Patent No.: US 12,709,202 B2
(45) Date of Patent: Aug. 18, 2026

(54) BASE FOR CHILD SAFETY SEAT

(71) Applicant: Wonderland Switzerland AG, Steinhausen (CH)

(72) Inventor: Xiaolong Mo, Steinhausen (CH)

(73) Assignee: Wonderland Switzerland AG, Steinhausen (CH)

( * ) Notice: Subject to any disclaimer, the term of this patent is extended or adjusted under 35 U.S.C. 154(b) by 212 days.

(21) Appl. No.: 18/580,707

(22) PCT Filed: Aug. 25, 2022

(86) PCT No.: PCT/EP2022/073720

§ 371 (c)(1),
(2) Date: Jan. 19, 2024

(87) PCT Pub. No.: WO2023/025908

PCT Pub. Date: Mar. 2, 2023

(65) Prior Publication Data

US 2024/0343170 A1 Oct. 17, 2024

(30) Foreign Application Priority Data

Aug. 25, 2021 (CN) ........................ 202110982577.7

(51) Int. Cl.
*B60N 2/28* (2006.01)

(52) U.S. Cl.
CPC ......... *B60N 2/2824* (2013.01); *B60N 2/2821* (2013.01); *B60N 2/2887* (2013.01)

(58) Field of Classification Search
CPC .... B60N 2/2887; B60N 2/289; B60N 2/2893; B60N 2/2821; B60N 2/2824; B60N 2/2827
See application file for complete search history.

(56) References Cited

U.S. PATENT DOCUMENTS

2020/0017003 A1* 1/2020 Persson ................ B60N 2/2887

FOREIGN PATENT DOCUMENTS

CN 106994923 A * 8/2017 ........... B60N 2/2887
CN 107499200 A * 12/2017 ........... B60N 2/2821
CN 109398180 A 3/2019

(Continued)

OTHER PUBLICATIONS

International Search Report and Written Opinion for Application No. PCT/EP2022/073720 dated Dec. 2, 2022.

(Continued)

*Primary Examiner* — Milton Nelson, Jr.

(74) *Attorney, Agent, or Firm* — Volpe Koenig

(57) ABSTRACT

The present disclosure provides a base for a child safety seat. The base includes a base bracket, an operating assembly and a telescopic tube. The operating assembly includes a locking piece connected to the base bracket, and the telescopic tube is provided with a plurality of locking portions along a length direction thereof. The locking portions is capable of being operated to engage with the locking portion, such that the telescopic tube and the base bracket are mutually locked. The locking member is capable of being operated to disengage from the locking portion, such that the telescopic tube and the base bracket are capable of sliding relative to each other. The base for the child safety seat has a simple structure and a low manufacturing cost.

20 Claims, 10 Drawing Sheets

(56) References Cited

FOREIGN PATENT DOCUMENTS

| | | | | | |
|---|---|---|---|---|---|
| CN | 211869203 U | | 11/2020 | | |
| CN | 112277737 A | | 1/2021 | | |
| DE | 202012101091 U1 | | 5/2012 | | |
| EP | 1900567 A1 | | 3/2008 | | |
| EP | 3521104 A1 | | 8/2019 | | |
| WO | 2015151181 A1 | | 10/2015 | | |
| WO | WO-2016066802 A | * | 5/2016 | ............ | B60N 2/289 |
| WO | 2018126713 A1 | | 7/2018 | | |
| WO | 2018172053 A1 | | 9/2018 | | |

OTHER PUBLICATIONS

Office Action issued in corresponding Taiwanese Application No. 111132117 dated Aug. 8, 2023. Partial English Translation Included.
China National Intellectual Property Office. Office Action for corresponding application CN 202110982577.7, dated Dec. 18, 2025. 13 pages. English translation provided.

* cited by examiner

BASE FOR CHILD SAFETY SEAT

CROSS-REFERENCE TO RELATED APPLICATIONS

This application is a U.S. national phase application under 35 U.S.C § 371 based upon International Patent Application No. PCT/EP2022/073720, filed on Aug. 25, 2022, which claims priority to Chinese Patent Application 202110982577.7, filed on Aug. 25, 2021. The contents of the above identified applications are hereby incorporated herein in their entireties by reference.

TECHNICAL FIELD

The present disclosure relates to the technical field of child safety seat, and in particular, to a base for a child safety seat.

BACKGROUND

An isofix system or other fixing systems for a child safety seat is generally provided with a base to adjust a mounting position of the safety seat in order to adapt to the mounting on vehicles of different models. However, at present, such bases tend to have complex structures and high manufacturing costs.

SUMMARY

According to some embodiments, a base for a child safety seat is provided.

A base for a child safety seat includes a base bracket, an operating assembly, and a telescopic tube. The operating assembly includes a locking member connected to the base bracket. The telescopic tube is provided with a plurality of locking portions in a length direction thereof. The locking member is capable of being operated to engage with one of the locking portions, such that the telescopic tube and the base bracket are mutually locked. The locking member is capable of being operated to disengage from the one of the locking portions, such that the telescopic tube and the base bracket are capable of sliding relative to each other.

In one of the embodiments, the locking member is pivotally connected to the base bracket. The locking member is capable of being rotated to engage with one of the locking portions, such that the telescopic tube and the base bracket are mutually locked. The locking member is capable of being rotated to disengage from the one of the locking portions, such that the telescopic tube and the base bracket are capable of sliding relative to each other.

In one of the embodiments, the locking member is provided with a male connecting portion, and the locking portions are female connecting portions capable of engaging with the male connecting portion.

In one of the embodiments, the locking member is provided with an engaging protrusion, and the locking portion is an engaging hole capable of cooperating with the engaging protrusion.

In one of the embodiments, the engaging protrusion has a first side surface and a second side surface arranged along an extending direction of the telescopic tube, and the first side surface is an engaging inclined surface inclined towards the second side surface.

In one of the embodiments, the operating assembly further includes an operating member capable of being operated to drive the locking member to engage with or disengage from the locking portion.

In one of the embodiments, the operating member includes an operating inclined surface. The operating member has a first position and a second position. When the operating member is in the first position, the operating inclined surface abuts against the locking member and the operating member is capable of being rotated to drive the locking member to rotate. When the operating member is in the second position, the operating inclined surface and the locking member are spaced apart from each other.

In one of the embodiments, the base further includes a first elastic member. Two ends of the first elastic member abut against the operating member and the base bracket respectively.

In one of the embodiments, the operating member includes an operating body, an operating pillar and a limiting hook. Both of the operating pillar and the limiting hook protrude from a side of the operating body. The operating inclined surface is arranged on an end of the operating pillar away from the operating body. The base bracket is provided with an accommodating groove configured to accommodate the operating member. A groove wall of the accommodating groove is formed with a limiting protrusion. When the operating member is mounted in the accommodating groove, the limiting hook is capable of engaging with the limiting protrusion to restrict the movement of the operating member towards an opening of the accommodating groove. Two ends of the first elastic member abut against the operating body and a groove bottom of the accommodating groove respectively. The groove bottom of the accommodating groove has a through hole, and the operating pillar is capable of passing through the through hole to abut against the locking member.

In one of the embodiments, the locking member includes a first locking piece and a second locking piece which are connected to each other and are arranged at a certain angle. The first locking piece is provided along an extending direction of the telescopic tube. The second locking piece is capable of being operated to enable the first locking piece to engage with the locking portion, and the second locking piece is capable of being operated to enable the first locking piece to disengage from the locking portion.

In one of the embodiments, the base further includes a second elastic member having two ends connected to the base bracket and the locking member respectively, and the elastic member constantly enables the locking member to move towards the locking portion to cooperate with the locking portion.

In one of the embodiments, the base further includes a fixing member fixed on a side of the base bracket. The two ends of the second elastic member are connected to the fixing member and the locking member respectively. The locking member is pivotally connected to the fixing member.

In one of the embodiments, the base further includes a guide cylinder fixed on a side of the base bracket. The guide cylinder is arranged outside the telescopic tube, and the telescopic tube is capable of sliding relative to the guide cylinder.

In one of the embodiments, the base further includes a linkage rod. Each of two sides of the base bracket is provided with the operating assembly, and each of two ends of the linkage rod is fixed on the locking member of a corresponding one of the operating assemblies.

In one of the embodiments, the base bracket includes a first support frame, a second support frame and a synchronizing member. The first support frame and the second support frame are spaced apart from each other. Two ends of the synchronizing member are fixed on the first support frame and the second support frame respectively, and each of the operating assemblies is arranged on a side of the first support frame or the second support frame away from the synchronizing member.

These and other objects, advantages, purposes and features will become apparent upon review of the following specification in conjunction with the drawings.

BRIEF DESCRIPTION OF THE DRAWINGS

In order to illustrate the technical solutions of the embodiments of the present disclosure more clearly, the accompanying drawings required in the embodiments of the present disclosure will be briefly introduced below. Obviously, the drawings described below are only some embodiments of the present disclosure, and for those of ordinary skill in the art, other drawings can also be obtained from these drawings without creative effort.

DESCRIPTION OF REFERENCE NUMERALS

Figure 1:
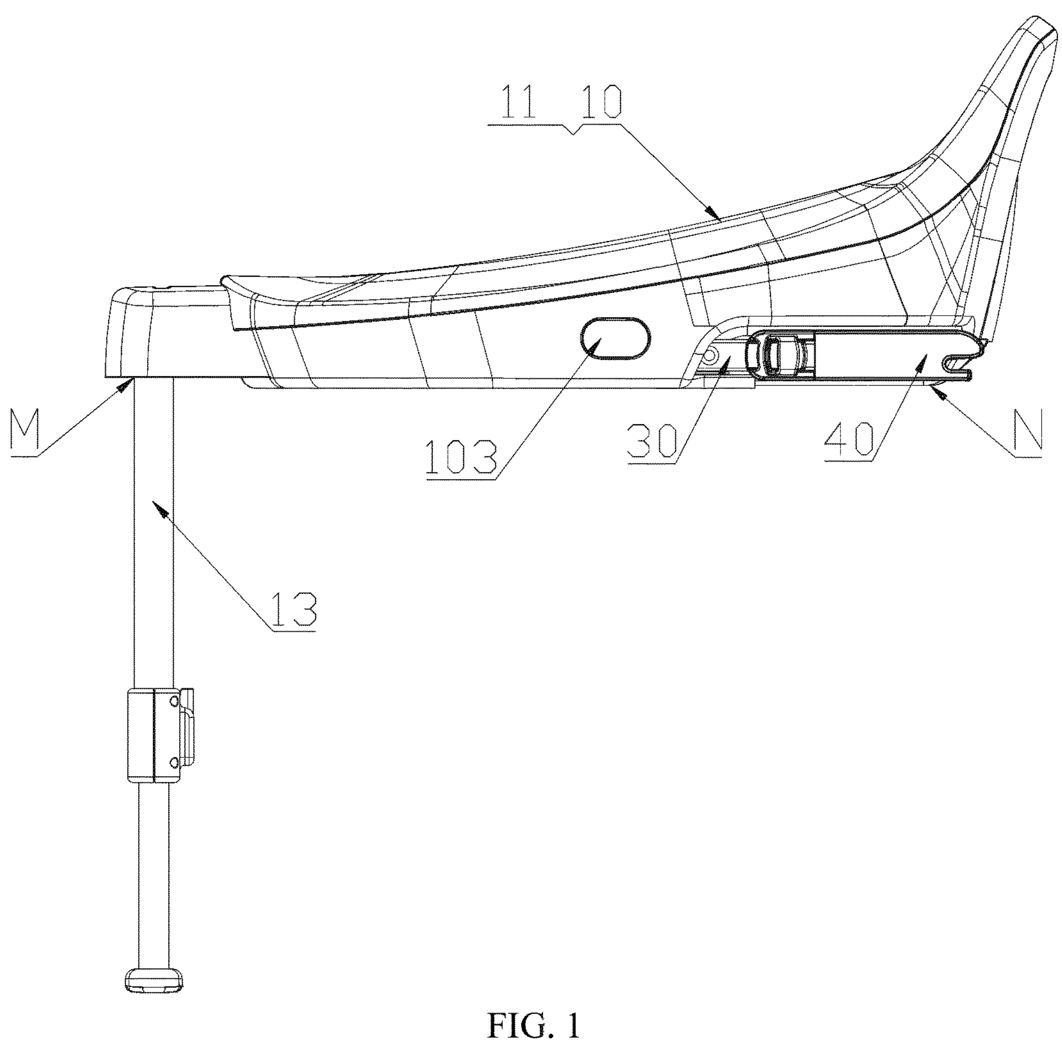
FIG. 1 is a schematic diagram illustrating a base for a child safety seat according to an embodiment of the present disclosure, where a telescopic tube is in a relatively shortened state.

10: base body, 11: base housing, 12: base bracket, 12*a*: first support frame, 12*b*: second support frame, 12*c*: synchronizing member, 13: supporting post, 20: telescopic mechanism, 100: operating assembly, 111: fixing member, 112: guide cylinder, 102: locking member, 211: first locking piece, 212: second locking piece, 213: engaging protrusion, 213*a*: first side surface, 213*b*: second side surface, 103: operating member, 310: operating inclined surface, 320: operating body, 321: pressing surface, 330: operating pillar, 340: limiting hook, 30: telescopic tube, 31: engaging hole, 31*a*: locking portion, 400: first elastic member, 500: second elastic member, 600: linkage rod, 40: anchor assembly, M: first end, N: second end.

DETAILED DESCRIPTION OF THE EMBODIMENTS

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that, although the terms first, second, etc. may be used herein to describe various elements, these elements should not be limited by these terms. These terms are only used to distinguish one element from another. Thus, a first element could be termed a second element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As shown in FIGS. 1 to 4, a base for a child safety seat is provided according to an embodiment of the present disclosure, which includes a base body 10, a telescopic mechanism 20 for an anchor assembly 40 (ISO-FIX assembly), and a telescopic tube 30. The base for the child safety seat has a simple structure and a low manufacturing cost.

Figure 3:
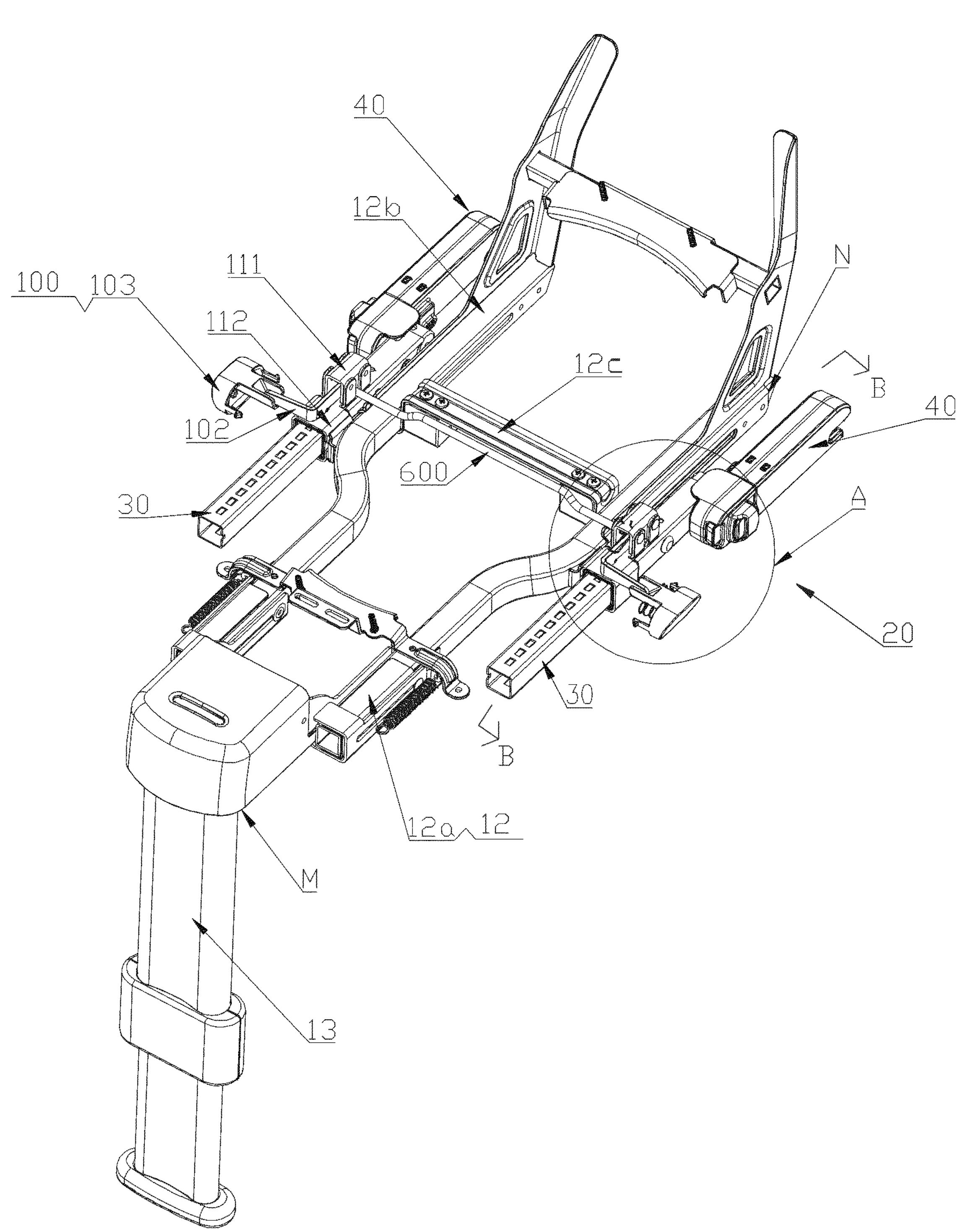
FIG. 3 is a schematic diagram illustrating the base for the child safety seat shown in FIG. 1 where a base housing is omitted.

Specifically, as shown in FIG. 3, the base body 10 is generally arranged below the seat (not shown) and configured to support the seat. The base body 10 includes a base housing 11, a base bracket 12 and a supporting post 13. The base bracket 12 is disposed in the base housing 11, and the supporting post 13 is fixed to a bottom of the base housing 11.

Figure 2:
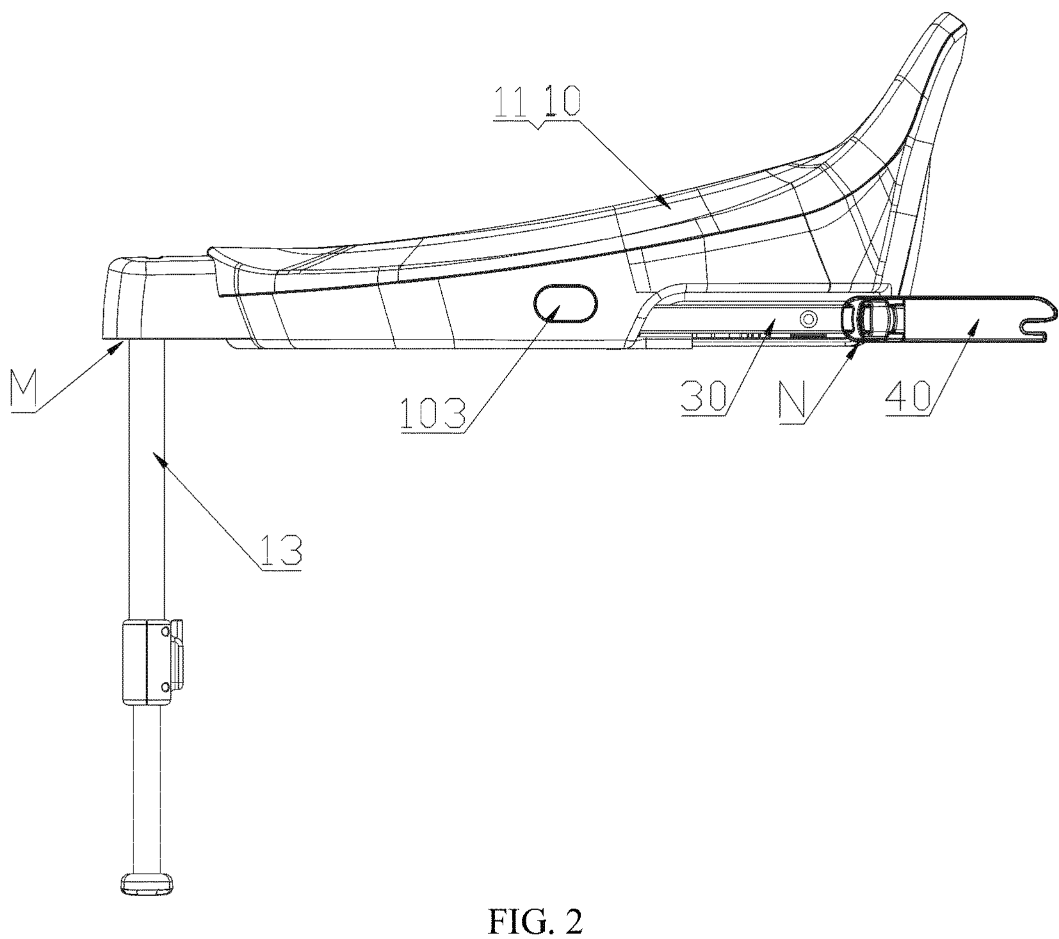
FIG. 2 is a schematic diagram illustrating the base for the child safety seat according to an embodiment of the present disclosure, where the telescopic tube is in a relatively elongated state.

Optionally, as shown in FIGS. 2 and 3, the base bracket 12 includes a first support frame 12*a* and a second support frame 12*b* spaced apart from each other. The base bracket 12 further includes a synchronization member 12*c* connected and fixed between the first support frame 12*a* and the second support frame 12*b*, that is, both ends of the synchronizing member 12*c* are fixed on the first support frame 12*a* and the second support frame 12*b* respectively. Optionally, the first support frame 12*a*, the second support frame 12*b* and the synchronization member 12*c* all have elongated structures and are made of a steel material. In other embodiments, the first support frame 12*a*, the second support frame 12*b* and the synchronization member 12*c* may also have other shapes and made of other materials.

Figure 4:
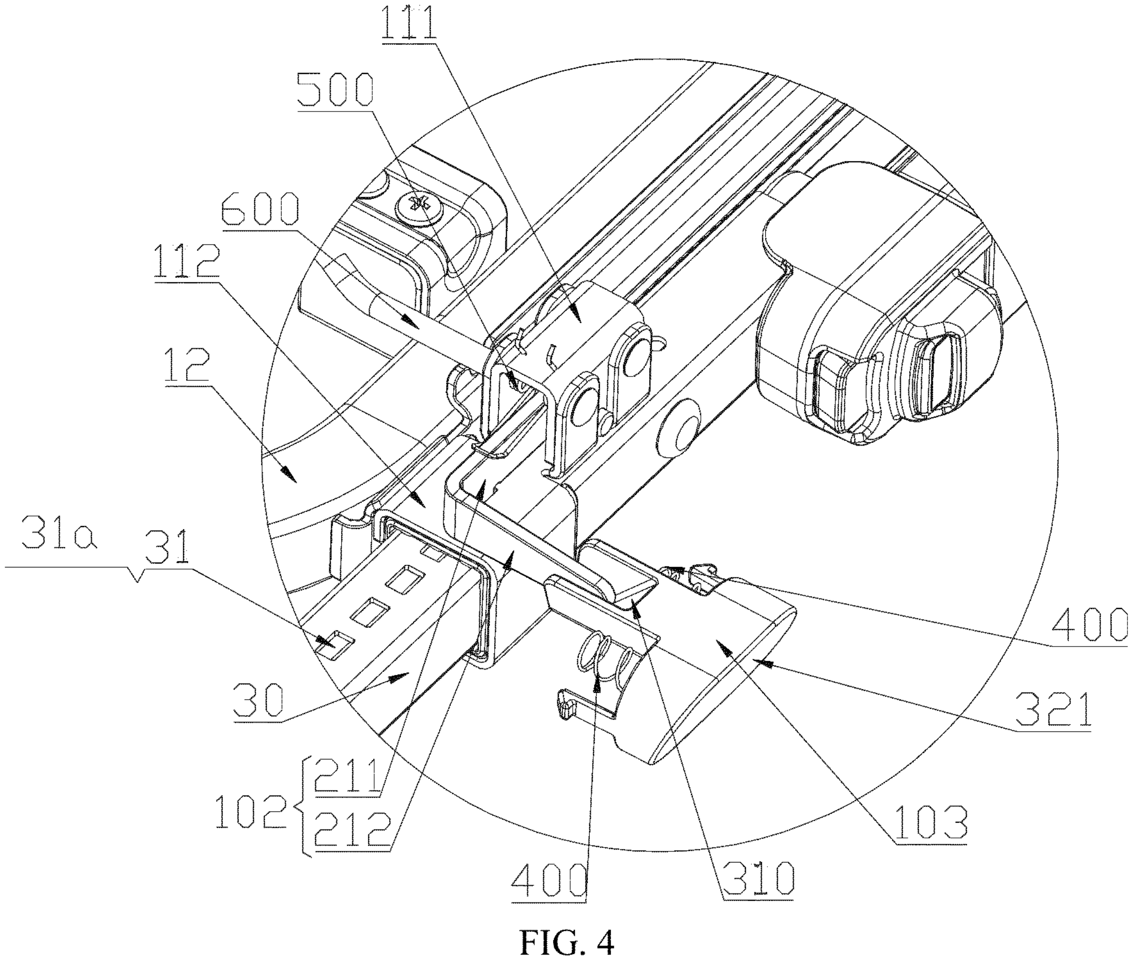
FIG. 4 is an enlarged view of portion A shown in FIG. 3.

Specifically, as shown in FIGS. 2 to 4, the telescopic mechanism 20 includes an operating assembly 100, a first elastic member 400, a second elastic member 500 and a linkage rod 600.

As shown in FIGS. 3 and 4, the operating assembly 100 includes a fixing member 111, a guide cylinder 112, a locking member 102 and an operating member 103.

In this embodiment, as shown in FIG. 3, each of two sides of the base bracket 12 is provided with the operating assembly 100. The fixing member 111 of each operating assembly 100 is fixed to a side of the first support frame 12*a* or the second support frame 12*b* away from the synchronization member 12*c* respectively, that is, each fixing member 111 is fixed to an outer side of the first support frame 12*a* or the second support frame 12*b* respectively. The guide cylinder 112 of each operating assemblies 100 is fixed to a side of the first support frame 12*a* or the second support frame 12*b* away from the synchronization member 12*c* respectively, that is, each guide cylinder 112 is fixed to an outer side of the first support frame 12*a* or the second support frame 12*b* respectively. In this embodiment, a cross section of the guide cylinder 112 has a non-circular structure, for example, a quasi-square structure. The guide cylinder 112 and the fixing member 111 located on the same side are arranged along an extending direction of the first support frame 12*a* or the second support frame 12*b*. Optionally, as shown in FIG. 4, the guide cylinder 112 is located in front of the fixing member 111, the guide cylinder 112 is located below the fixing member 111 and a bottom surface of the fixing member 111 is connected to a top surface of the guide cylinder 112.

In this embodiment, as shown in FIG. 3, the telescopic tube 30 is configured to be connected to an anchor assembly 40, and the locking member 102 is connected to the base bracket 12. In this embodiment, the locking member 102 is pivotally connected to the base bracket 12. In other embodiments, the locking member 102 may also be slidably connected to the base bracket 12. The telescopic tube 30 is provided with a plurality of locking portions 31*a* along a longitudinal direction thereof. The locking member 102 is capable of being operated, for example, rotated, to engage with one of the locking portions 31*a*, such that the telescopic tube 30 and the base bracket 12 are mutually locked. The locking member 102 is also capable of being operated, for example, rotated, to disengage from the one of the locking portions 31*a*, such that the telescopic tube 30 and the base bracket 12 are capable of sliding relative to each other.

In this way, a position of the telescopic tube 30 relative to the base bracket 12 can be adjusted by operating the locking member 102. As shown in FIGS. 1 and 2, the base bracket 12 includes a first end M and a second end N, which are in correspondence to a leftmost end and a rightmost end respectively as shown in FIGS. 1 and 2. The supporting post 13 is fixed to the first end M of the base bracket 12, and the telescopic tube 30 is capable of being moved to extend out of the second end N. When the child safety seat is installed and fixed in the vehicle, by adjusting the position of the telescopic tube 30 relative to the telescopic tube 30, a length of the telescopic tube 30 extending from the second end N of the base bracket 12 can be adjusted, that is, a length of the anchor assembly 40 extending from the second end N of the base bracket 12 can be adjusted, so as to meet the connection and fixation requirements of different vehicle models. The aforementioned base for the child safety seat has a simple structure and a low manufacturing cost.

Further, as shown in FIG. 4, the locking member 102 includes a first locking piece 211 and a second locking piece 212 which are connected to each other and are arranged at a certain angle. For example, the first locking piece 211 and the second locking piece 212 may be perpendicular to each other, forming an "L" shaped structure. The first locking piece 211 is disposed along an extending direction of the telescopic tube 30. The second locking piece 212 is capable of being operated, for example, rotated, such that the first locking piece 211 engages with the locking portion 31*a*. The second locking piece 212 is capable of being operated, for example, rotated, such that the first locking piece 211 disengages from the locking portion 31*a*. In this embodiment, the locking piece 102 is located above the guide cylinder 112. An end of the first locking piece 211 away from the second locking piece 212 extends into the fixing member 111, and the first locking piece 211 is pivotally connected to a side wall of the fixing member 111.

Further, as shown in FIG. 4, the telescopic tube 30 is inserted into the guide cylinder 112, that is, the guide cylinder 112 is arranged outside the telescopic tube 30, and the telescopic tube 30 is capable of sliding relative to the guide cylinder 112. Thus, the guide cylinder 112 is capable of guiding a moving direction of the telescopic tube 30 to prevent the telescopic tube 30 from deviating from the moving direction during a sliding process. In this embodiment, a backward direction refers to a direction from the first end M to the second end N, and a forward direction refers to a direction from the second end N to the first end M. The moving direction is toward the forward direction or toward the backward direction.

Figure 6:
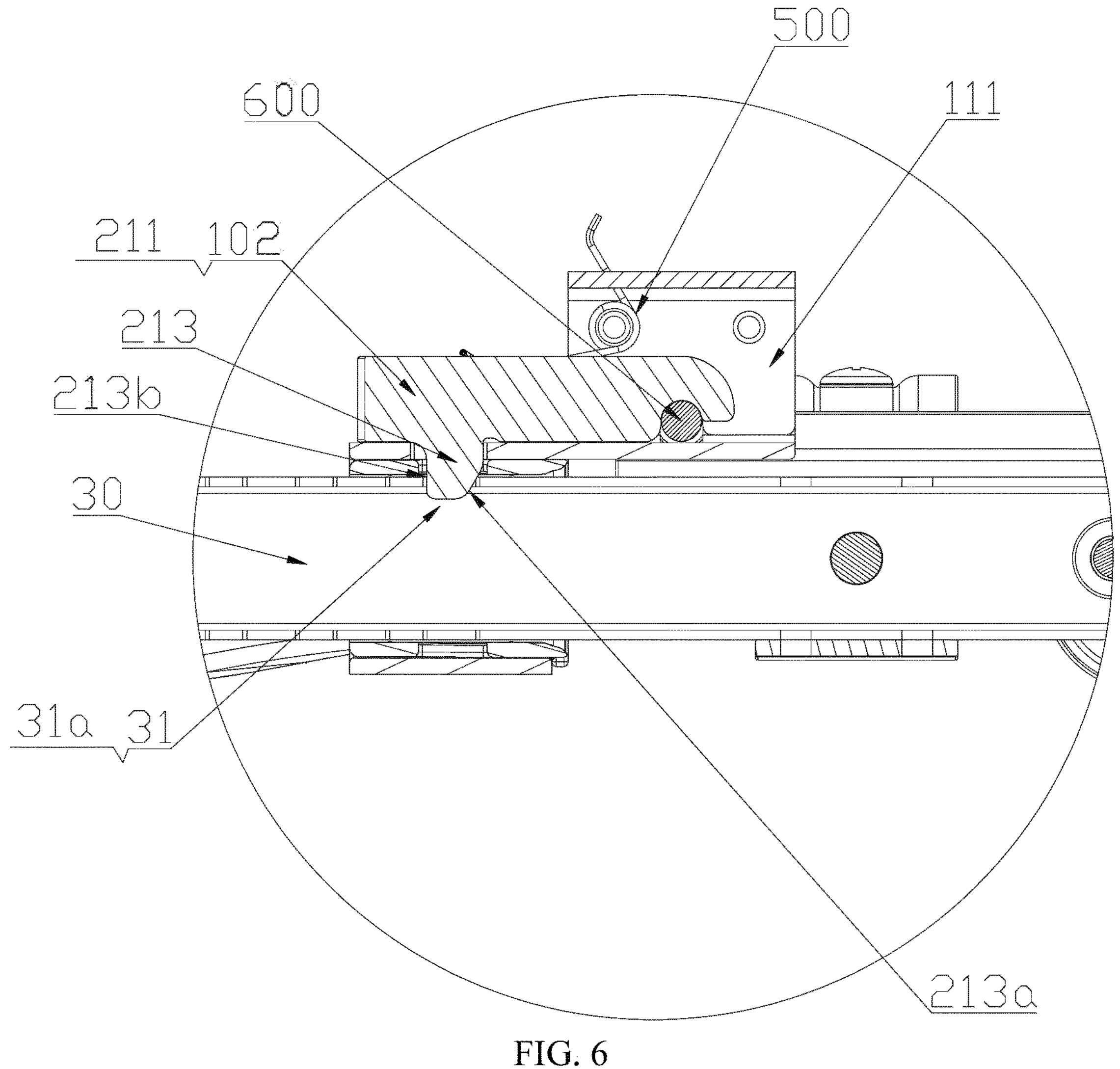
FIG. 6 is an enlarged view of portion C shown in FIG. 5.
Figure 8:
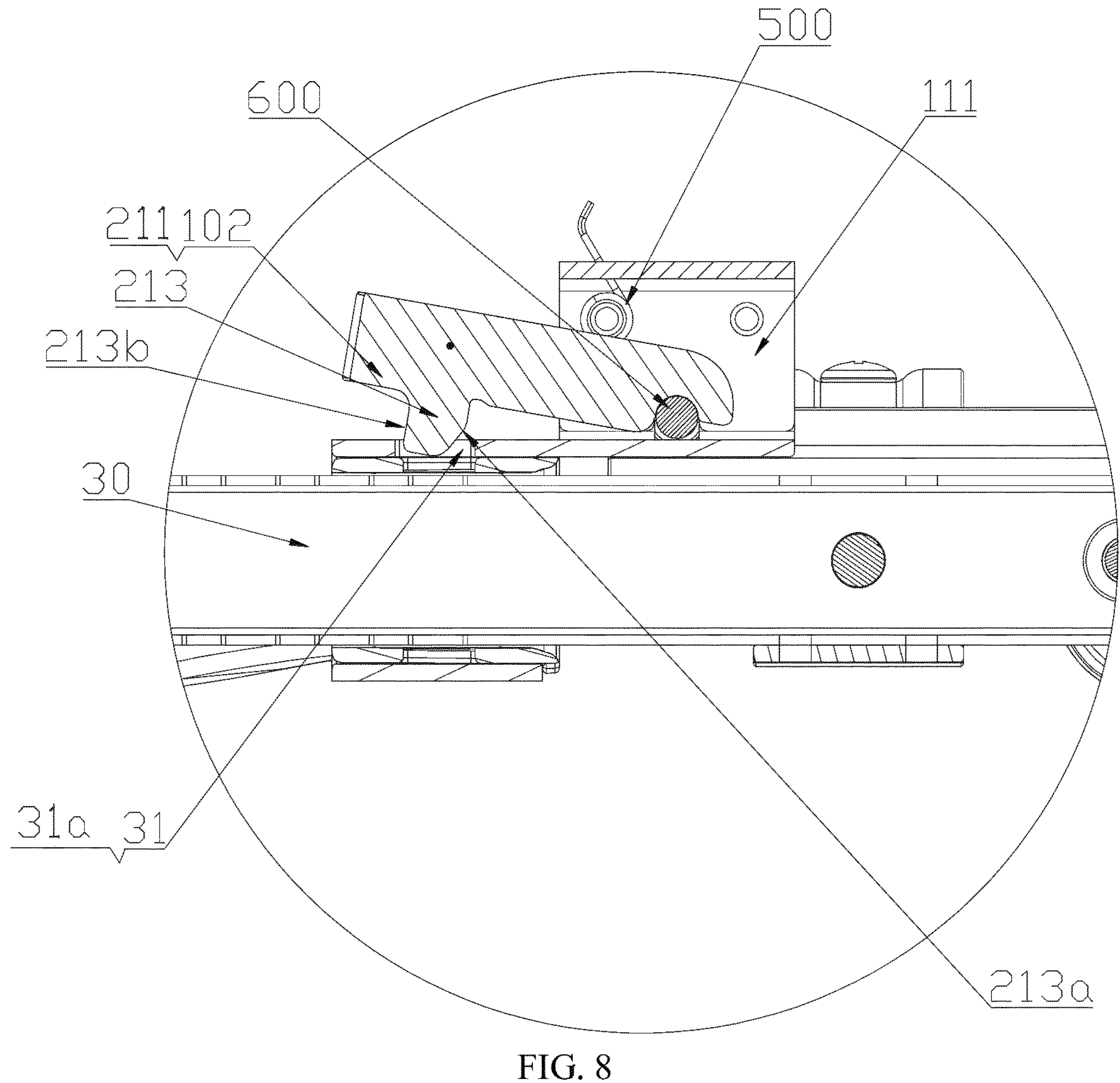
FIG. 8 is an enlarged view of portion D shown in FIG. 7.

Further, the locking member 102 is provided with a male connecting portion, and the locking portion 31*a* is a female connecting portion capable of engaging with the male connecting portion. In this embodiment, as shown in FIGS. 6 and 8, the locking member 102 may be provided with an engaging protrusion 213, and the engaging protrusion 213 is specifically provided on the first locking piece 211. The locking portion 31*a* is an engaging hole 31 capable of engaging with the engaging protrusion 213. The locking between the base bracket 12 and the telescopic tube 30 is achieved by the engagement of the engaging protrusion 213 and the engaging hole 31, and the structure is simple and easy to implement. The engaging protrusion 213 has a first side surface 213*a* a and a second side surface 213*b* arranged along the extending direction of the telescopic tube 30, and the first side surface 213*a* is an engaging inclined surface inclined toward the second side surface 213*b*. In this embodiment, the first side surface 213*a* is located behind the second side surface 213*b*. When it is required to move the telescopic tube 30 in the forward direction of the base bracket 12, that is, to shorten a length of the telescopic tube 30 extending from the second end N of the base bracket 12 (referred to as the extending length), there is no need to operate the locking member 102, and the telescopic tube 30 can be moved directly toward the forward direction of the base bracket 12, which is easy to operate and saves time and effort. The first side surface 213*a* may also be located in front of the second side surface 213*b*. When it is required to move the telescopic tube 30 in the backward direction of the base bracket 12, that is, to extend the extending length of the telescopic tube 30, there is no need to operate the locking member 102, and the telescopic tube 30 can be moved directly toward the backward direction of the base bracket 12.

In other embodiments, the locking member 102 may also be provided with an engaging protrusion, and the locking portion 31*a* is correspondingly an engaging groove that can be engaged with the engaging protrusion, as long as the locking member 102 and the locking portion 31*a* can be engaged, which is not limited thereto.

Figure 9:
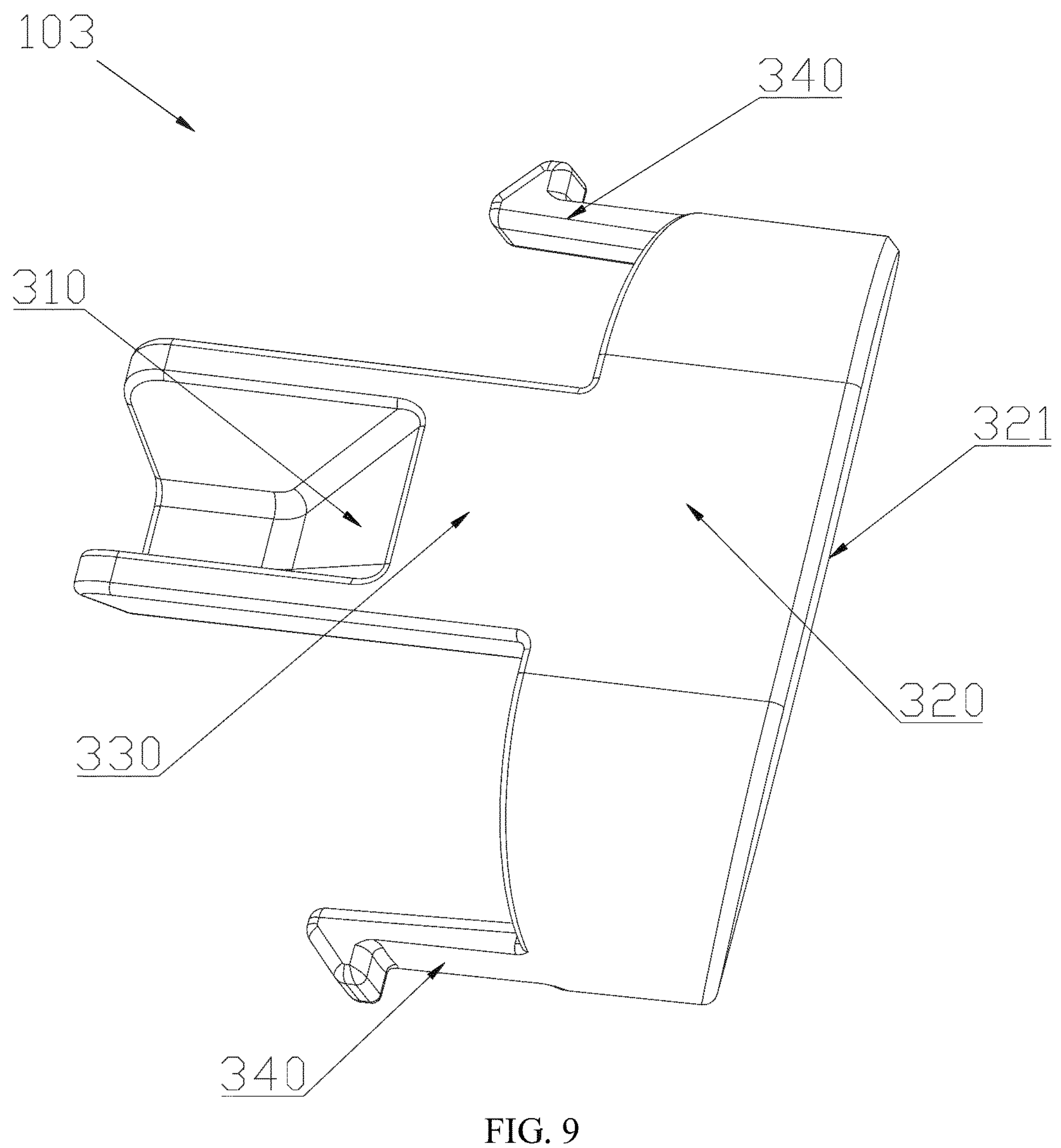
FIG. 9 is a schematic diagram illustrating an operating member in the base for the child safety seat shown in FIG. 3.
Figure 10:
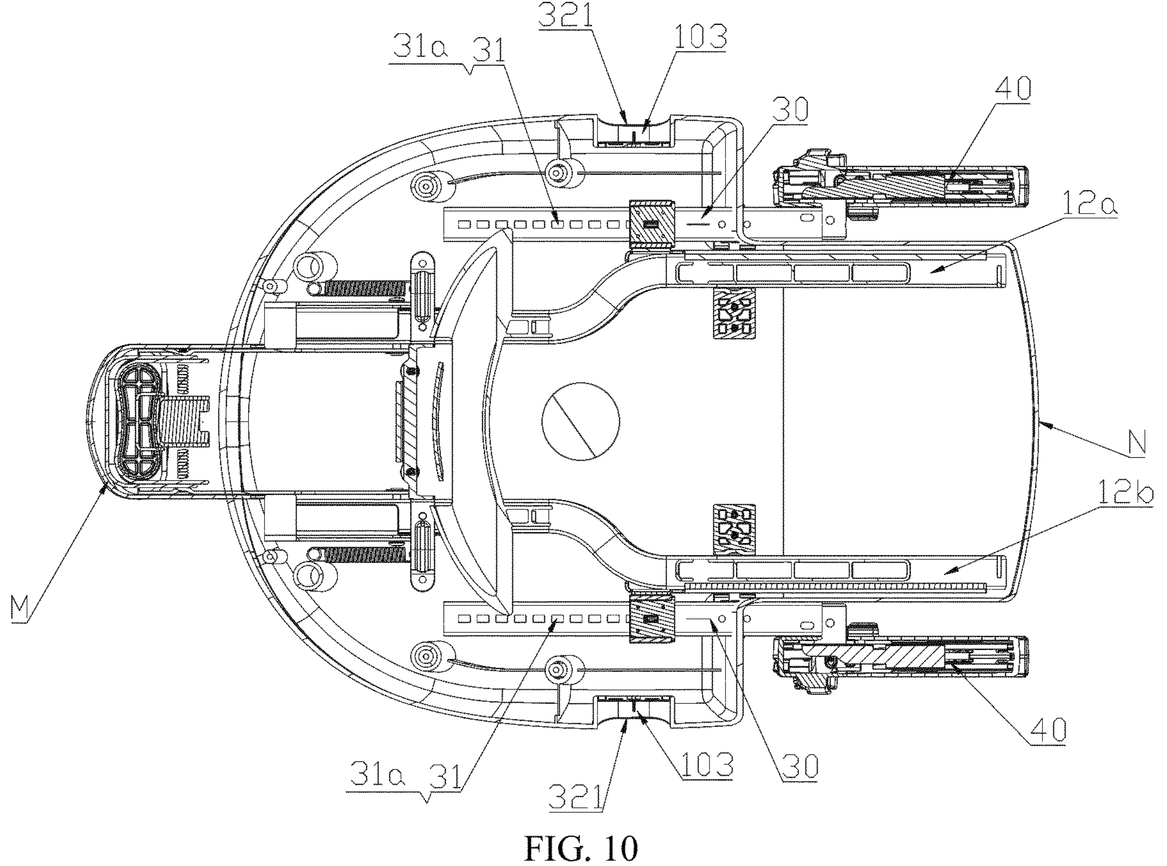
FIG. 10 is a bottom view of FIG. 1.

Further, as shown in FIG. 4, the operating member 103 is capable of being operated to drive the locking member 102 to rotate to engage with or disengage from the locking portion 31*a*. specially, referring to FIG. 9, the operating member 103 has an operating inclined surface 310, and the operating member 103 has a first position and a second position. When the operating member 103 is in the first position, the operating inclined surface 310 abuts against the locking member 102, the operating member 103 is capable of rotating to drive the locking member 102 to rotate. When the operating member 103 is in the second position, the operating inclined surface 310 and the locking member 102 are spaced apart from each another.

Specifically, as shown in FIGS. 4 and 9, the operating member 103 includes an operating body 320, an operating pillar 330 and two limiting hooks 340 protruding from one side of the operating body 320. In this embodiment, each of two sides of the operating pillar 330 is provided with the limiting hook 340. In other embodiments, the number and the positions of the limiting hooks 340 can also be adjusted accordingly. A surface of the operating body 320 facing away from the operating pillar 330 and the limiting hook 340 is formed with a pressing surface 321 for the user to press. The operating inclined surface 310 is provided at an end of the operating pillar 330 away from the operating body 320, the base bracket 12 is provided with an accommodating groove (not shown in the drawing) for accommodating the operating member 103, and a groove wall of the accommodating groove is formed with a limiting protrusion (not shown in the drawing). When the operating member 103 is mounted in the accommodating groove, the limiting hook 340 is capable of engaging with the limiting protrusion to limit the movement of the operating member 103 towards an opening of the accommodating groove. A bottom of the accommodating groove has a through hole (not shown), and the operating pillar 330 is capable of passing through the through hole to abut against the locking member 102. Thus, on the one hand, the operating member 103 can be restricted from escaping from the opening of the accommodating groove, and on the other hand, the operating member 103 does not be interfered from being pressed toward the groove bottom of the accommodating groove, such that the operating inclined surface 310 of the operating member 103 is capable of abutting against the locking member 102, and by rotating the operating member 103, the operating inclined surface 310 is capable of pushing against the locking member 102 to rotate, such that the locking member 102 engages with or disengages from the locking portion 31*a*.

Figure 5:
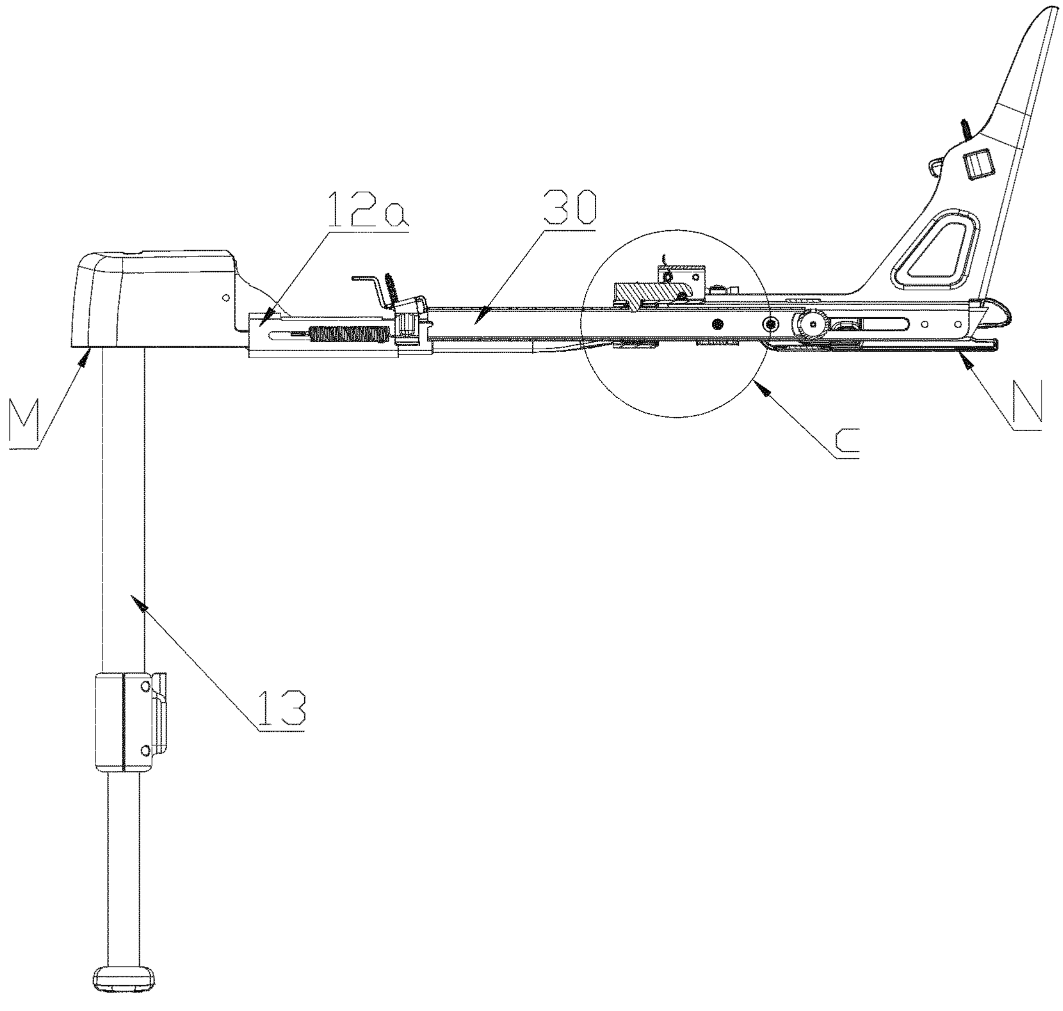
FIG. 5 is a sectional view along line B-B shown in FIG. 3, where an engaging protrusion cooperates with an engaging hole.
Figure 7:
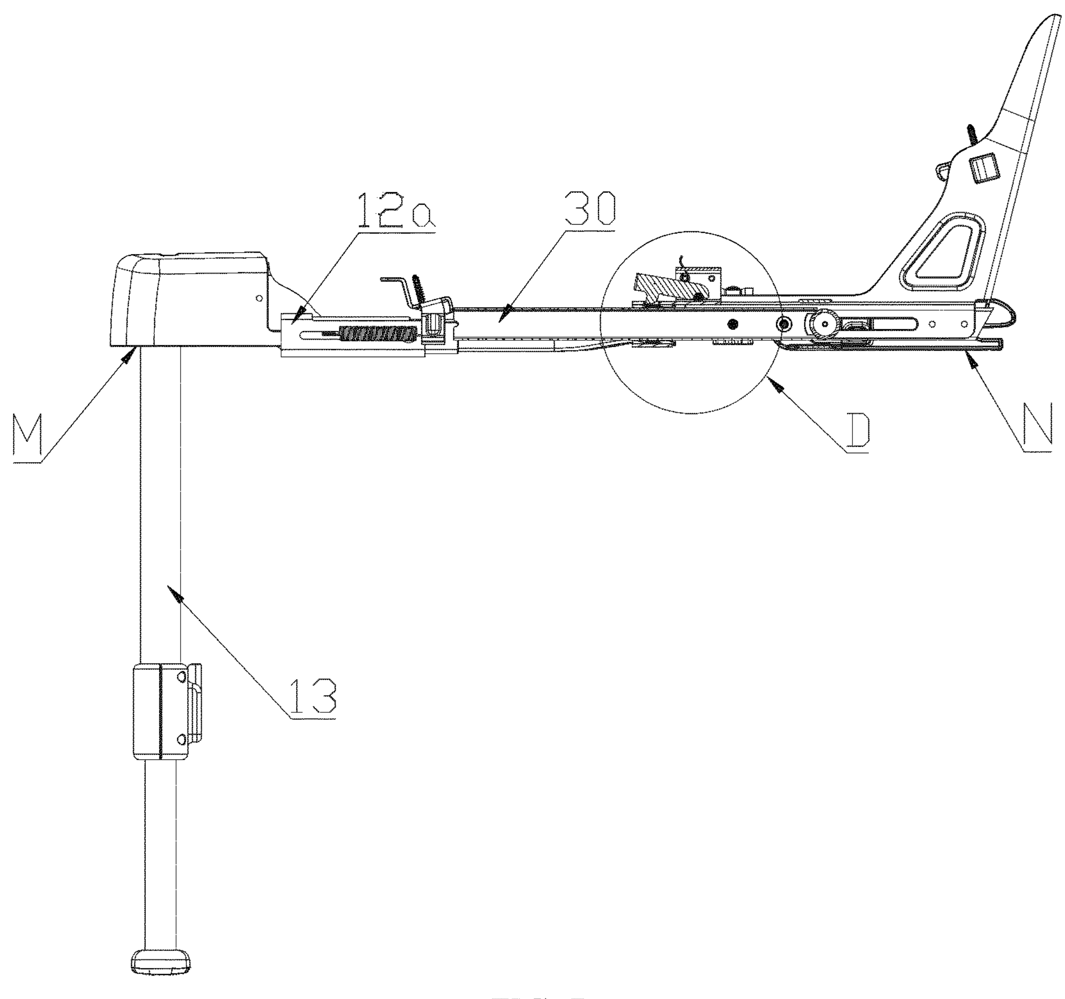
FIG. 7 is a sectional view along line B-B shown in FIG. 3, where the engaging protrusion does not cooperate with the engaging hole.

Further, as shown in FIG. 4, both ends of the first elastic member 400 abut against the operating member 103 and the base bracket 12 respectively. Specifically, the both ends of the first elastic member 400 abut against the operating body 320 and the bottom of the accommodating groove respectively. The first elastic member 400 makes the operating member 103 always have a tendency to move in a direction towards the opening of the accommodating groove. When a certain external force is applied to the pressing surface 321 of the operating member 103, the operating member 103 is capable of overcoming an elastic force of the first elastic member 400 and moving toward the bottom of the groove, such that the operating pillar 330 passes through the through hole and abuts against the locking member 102. Specifically, the operating pillar 330 abuts against the second locking piece 212. The operating pillar 330 is rotated, such that the operating inclined surface 310 at an end of the operating pillar 330 pushes against the locking member 102 and makes the locking member 102 rotate, such that the engaging protrusion 213 on the first locking piece 211 disengages from any one of the engaging holes 31, as shown in FIGS. 7 and 8. As shown in FIG. 5 and FIG. 6, when the length adjustment of the telescopic tube 30 is completed, the engaging protrusion 213 and another engaging hole 31 are re-engaged. Then, cancel the external force applied to the pressing surface 321, and the operating assembly 100 is in turn reset under the action of the elastic force of the elastic member 400. After resetting, the operating assembly 100 and the locking member 102 are spaced apart from each other. In this way, when the telescopic tube 30 is directly pushed to shorten or extend the extending length of the telescopic tube 30, an interference of the operating member 103 with the locking member 102 can be avoided.

Optionally, as shown in FIG. 4, both sides of the operating pillars 330 are provided with the first elastic members 400 respectively. Thus, a more balanced elastic force can be provided for the operating member 103. In this embodiment, the first elastic member 400 is a spring. In other embodiments, the first elastic member 400 may also be a silicone elastic pillar, etc., which is not limited.

Further, as shown in FIG. 4, the two ends of the second elastic member 500 are specifically connected to a side wall of the fixing member 111 and the second locking piece 212, such that the locking member 102 always has a tendency to rotate in a direction of engaging with the locking portion 31*a*. In this way, when the locking member 102 disengages from any one of the locking portions 31*a* and the adjustment of the extending length of the telescopic tube 30 is completed, the external force applied to the operating member 103 can be canceled, and the locking member 102 is capable of being reset automatically under the action of the elastic force of the second elastic member 500 and re-engaging with another locking portion 31*a*, which can also improve the cooperation stability of the locking member 102 and the locking portion 31*a*, thereby ensuring the relative fixation of the telescopic tube 30 and the base bracket 12. In this embodiment, the second elastic member 500 is a torsion spring, but is not limited thereto.

Further, as shown in FIGS. 3 and 4, first locking piece 211 are pivotally connected to side walls of the fixing members 111 on both sides of the base bracket 12, respectively. Thus, it is convenient to adjust the extending lengths of the telescopic tubes 30 on both sides of the base bracket 12.

Further, as shown in FIGS. 3 and 4, both ends of the linkage rod 600 are respectively fixed on the locking members 102 of both of the operating assemblies 100. When the locking member 102 on one side of the base bracket 12 is rotated, the locking member 102 on the other side of the base bracket 12 can be simultaneously rotated by the linkage action of the linkage rod 600, thereby realizing the simultaneous adjustment of the extending length of the telescopic tubes 30 on both sides of the base bracket 12. Thus, it is only necessary to operate the operating assembly 100 on one side of the base bracket 12 to realize the adjustment of the telescopic tubes 30 on both sides, which is easy to operate. Moreover, the linkage adjustment function of the telescopic tubes 30 on both sides can be realized by a linkage rod 600, such that the structure is simple, the realization is easy, and the manufacturing cost is low. In this embodiment, both ends of the linkage rod 600 are connected to the locking members 102 of both of the operating assemblies 100 respectively. In some embodiments, both ends of the linkage rod 600 may also be fixed on the locking members 102 of both of the operating assemblies 100 by, for example, welding or riveting. The fixing members 111 on both sides of the base bracket 12 are provided with opposite mounting holes (not shown in the drawings), and both ends of the linkage rod 600 are fixed to the corresponding locking members 102 through the opposite mounting holes respectively.

In all, the aforementioned base for the child safety seat has the following technical effects.

In the aforementioned base, the locking member 102 in the operating assembly 100 is connected to the base bracket 12. By operating the locking member 102, the locking member 102 is capable of engaging with any one of the locking portions 31*a* on the telescopic tube 30, such that the base bracket 12 is fixed at a certain length position relative to the telescopic tube 30. When the extending length of the telescopic tube 30 needs to be adjusted, it is only needed to operate the locking member 102 to disengage from the locking portion 31*a*, such that the telescopic tube 30 and the base bracket 12 is capable of sliding relative to each other.

After the telescopic tube 30 slides to a desired position relative to the base bracket 12, the locking member 102 is capable of being operated to cooperate with another locking portion 31*a* on the telescopic tube 30, thereby realizing the relative position adjustment between the base bracket 12 and the telescopic tube 30, that is, realizing the adjustment of the extending length of the telescopic tube 30.

The technical features of the aforementioned embodiments may be combined arbitrarily. To simplify the description, not all possible combinations of the technical features in the aforementioned embodiments are described. However, all of the combinations of these technical features should be considered as within the scope of the present disclosure, as long as there is no contradiction in these combinations.

The aforementioned examples merely illustrate several embodiments of the present disclosure, and the description thereof is specific and detailed, but it shall not be construed as limiting the scope of the disclosure. It should be noted that a plurality of variations and modifications may be made by those skilled in the art without departing from the scope of the present disclosure, which are all within the scope of protection of the present disclosure. Therefore, the protection scope of the present disclosure shall be defined by the appended claims.

The invention claimed is:

1. A base for a child safety seat, the base comprising:
a base bracket,
a telescopic tube provided with a plurality of locking portions in a length direction thereof,
an operating assembly comprising:
a locking member connected to the base bracket, and
an operating member comprising an operating inclined surface, the operating member has a first position and a second position, wherein, when the operating member is in the first position, the operating inclined surface abuts against the locking member and the operating member is capable of being rotated to drive the locking member to rotate, and when the operating member is in the second position, the operating inclined surface and the locking member are spaced apart from each another,
wherein the locking member is capable of being operated to engage with one of the locking portions, such that the telescopic tube and the base bracket are mutually locked, and
the locking member is capable of being operated to disengage from the one of the locking portions, such that the telescopic tube and the base bracket are capable of sliding relative to each other.

2. The base according to claim 1, wherein the locking member is pivotally connected to the base bracket, the locking member is capable of being rotated to engage with one of the locking portions, such that the telescopic tube and the base bracket are mutually locked, and the locking member is capable of being rotated to disengage from the one of the locking portions, such that the telescopic tube and the base bracket are capable of sliding relative to each other.

3. The base according to claim 1, wherein the locking member is provided with a male connecting portion, and the locking portions are female connecting portions capable of engaging with the male connecting portion.

4. The base according to claim 1, wherein the locking member is provided with an engaging protrusion, and the locking portion is an engaging hole capable of cooperating with the engaging protrusion.

5. The base according to claim 4, wherein the engaging protrusion has a first side surface and a second side surface arranged along an extending direction of the telescopic tube, and the first side surface is an engaging inclined surface inclined towards the second side surface.

6. The base according to claim 1, wherein the operating member is capable of being operated to drive the locking member to engage with or disengage from the locking portion.

7. The base according to claim 6, further comprising a first elastic member, wherein two ends of the first elastic member abut against the operating member and the base bracket respectively.

8. The base according to claim 7, wherein the operating member comprises an operating body, an operating pillar and a limiting hook, both of the operating pillar and the limiting hook protrude from a side of the operating body, the operating inclined surface is arranged on an end of the operating pillar away from the operating body, the base bracket is provided with an accommodating groove configured to accommodate the operating member, a groove wall of the accommodating groove is formed with a limiting protrusion, wherein, when the operating member is mounted in the accommodating groove, the limiting hook is capable of engaging with the limiting protrusion to restrict a movement of the operating member towards an opening of the accommodating groove, two ends of the first elastic member abut against the operating body and a groove bottom of the accommodating groove respectively, the groove bottom of the accommodating groove has a through hole, and the operating pillar is capable of passing through the through hole to abut against the locking member.

9. The base according to claim 1, wherein the locking member comprises a first locking piece and a second locking piece which are connected to each other and are arranged at a certain angle, the first locking piece is provided along an extending direction of the telescopic tube, the second locking piece is capable of being operated to enable the first locking piece to engage with the locking portion, and the second locking piece is capable of being operated to enable the first locking piece to disengage from the locking portion.

10. The base according to claim 1, further comprising a second elastic member having two ends connected to the base bracket and the locking member respectively, and wherein the second elastic member constantly enables the locking member to move towards the locking portion to cooperate with the locking portion.

11. The base according to claim 10, further comprising a fixing member fixed on a side of the base bracket, wherein the two ends of the second elastic member are connected to the fixing member and the locking member respectively, and the locking member is pivotally connected to the fixing member.

12. The base according to claim 1, further comprising a guide cylinder fixed on a side of the base bracket, wherein the guide cylinder is arranged outside the telescopic tube, and the telescopic tube is capable of sliding relative to the guide cylinder.

13. A base for a child safety seat, the base comprising:
a base bracket,
a telescopic tube provided with a plurality of locking portions in a length direction thereof,
an operating assembly comprising a locking member connected to the base bracket, wherein the locking member is capable of being operated to engage with one of the locking portions, such that the telescopic tube and the base bracket are mutually locked, and the locking member is capable of being operated to disengage from the one of the locking portions, such that the telescopic tube and the base bracket are capable of sliding relative to each other, and a linkage rod having a first end and a second end, wherein the operating assembly comprises a first operating assembly and a second operating assembly, the base bracket comprises a first side and a second side spaced apart from the first side, the first side of the base bracket is provided with the first operating assembly and the second side of the base bracket is provided with the second operating assembly, and the first end of the linkage rod is fixed on the locking member of of the first operating assembly and the second end of the linkage rod is fixed on the locking member of the second operating assembly.

14. The base according to claim 1, wherein the base bracket comprises a first support frame, a second support frame and a synchronizing member having a first end and a second end, the first support frame and the second support frame are spaced apart from each other, the first end of the synchronizing member is fixed on the first support frame and the second end of the synchronizing member is fixed on the second support frame, and the operating assembly comprises a first operating assembly arranged on a side of the first support frame away from the synchronizing member and a second operating assembly arranged on a side of the second support frame away from the synchronizing member.

15. The base according to claim 13, wherein the locking member is pivotally connected to the base bracket, the locking member is capable of being rotated to engage with one of the locking portions, such that the telescopic tube and the base bracket are mutually locked, and the locking member is capable of being rotated to disengage from the one of the locking portions, such that the telescopic tube and the base bracket are capable of sliding relative to each other.

16. The base according to claim 13, wherein the locking member is provided with a male connecting portion, and the locking portions are female connecting portions capable of engaging with the male connecting portion, or the locking member is provided with an engaging protrusion, and the locking portion is an engaging hole capable of cooperating with the engaging protrusion.

17. The base according to claim 16, wherein the engaging protrusion has a first side surface and a second side surface arranged along an extending direction of the telescopic tube, and the first side surface is an engaging inclined surface inclined towards the second side surface.

18. The base according to claim 13, wherein at least one of the first operating assembly and the second operating assembly further comprises an operating member capable of being operated to drive the locking member to engage with or disengage from the locking portion.

19. The base according to claim 18, further comprising a first elastic member, wherein two ends of the first elastic member abut against the operating member and the base bracket respectively.

20. The base according to claim 19, wherein the operating member comprises an operating body, an operating pillar and a limiting hook, both of the operating pillar and the limiting hook protrude from a side of the operating body, the operating inclined surface is arranged on an end of the operating pillar away from the operating body, the base bracket is provided with an accommodating groove configured to accommodate the operating member, a groove wall of the accommodating groove is formed with a limiting protrusion, wherein, when the operating member is mounted in the accommodating groove, the limiting hook is capable of engaging with the limiting protrusion to restrict a movement of the operating member towards an opening of the accommodating groove, two ends of the first elastic member abut against the operating body and a groove bottom of the accommodating groove respectively, the groove bottom of the accommodating groove has a through hole, and the operating pillar is capable of passing through the through hole to abut against the locking member of the at least one of the first operating assembly and the second operating assembly.

* * * * *